United States Patent [19]

Verbaan

[11] 4,330,379
[45] May 18, 1982

[54] LEACHING OF ZINC CONTAINING SULPHIDE MINERALS

[75] Inventor: Bernard Verbaan, Fontainebleau, South Africa

[73] Assignee: National Institute for Metallurgy, Randburg, South Africa

[21] Appl. No.: 231,477

[22] Filed: Feb. 3, 1981

Related U.S. Application Data

[63] Continuation-in-part of Ser. No. 113,284, Jan. 18, 1980, Pat. No. 4,274,931.

[30] Foreign Application Priority Data

Jan. 24, 1979 [ZA] South Africa ................ 79/0294
Aug. 14, 1980 [ZA] South Africa ................ 80/4989

[51] Int. Cl.³ .............................................. C25C 1/16
[52] U.S. Cl. .................................. 204/119; 423/109; 75/120; 75/104
[58] Field of Search .............. 423/109; 75/104, 120; 204/119

[56] References Cited

U.S. PATENT DOCUMENTS

| | | | |
|---|---|---|---|
| 2,927,017 | 3/1960 | Marvin | 75/120 |
| 2,996,440 | 8/1961 | Forward | 204/119 |
| 3,316,059 | 4/1967 | Vizsolyi | 75/120 |
| 3,477,927 | 11/1969 | Veltman | 204/119 |
| 4,004,991 | 1/1977 | Veltman | 204/119 |
| 4,071,421 | 1/1978 | Masters | 204/119 |
| 4,274,931 | 6/1981 | Verbaan | 204/119 |

FOREIGN PATENT DOCUMENTS

| | | | |
|---|---|---|---|
| 224 | 3/1980 | South Africa . | |
| 1001121 | 8/1965 | United Kingdom | 423/109 |

*Primary Examiner*—Brian E. Hearn
*Attorney, Agent, or Firm*—Cushman, Darby & Cushman

[57] ABSTRACT

A process for treating zinc sulphide materials wherein the sub-divided material is firstly leached, under pressure at less than 119° C., with a sulphate leach solution low in sulphuric acid and having a high iron content together with zinc and impurities in a manner causing iron to precipitate and subsequently leaching the residue and redissolving the iron precipitate with spent electrolyte containing regenerated sulphuric acid resulting from the treatment of the leach liquor obtained from the first leach step and wherein the leach solution from the subsequent leach step constitutes the starting leach solution for the first leach step. The second leach step is carried out in two phases; a first leach phase conducted at elevated pressure and elevated temperature (less than 119° C.) in the presence of oxygen and a second phase at atmospheric pressure and without the supply of free oxygen to the leach solution.

13 Claims, 1 Drawing Figure

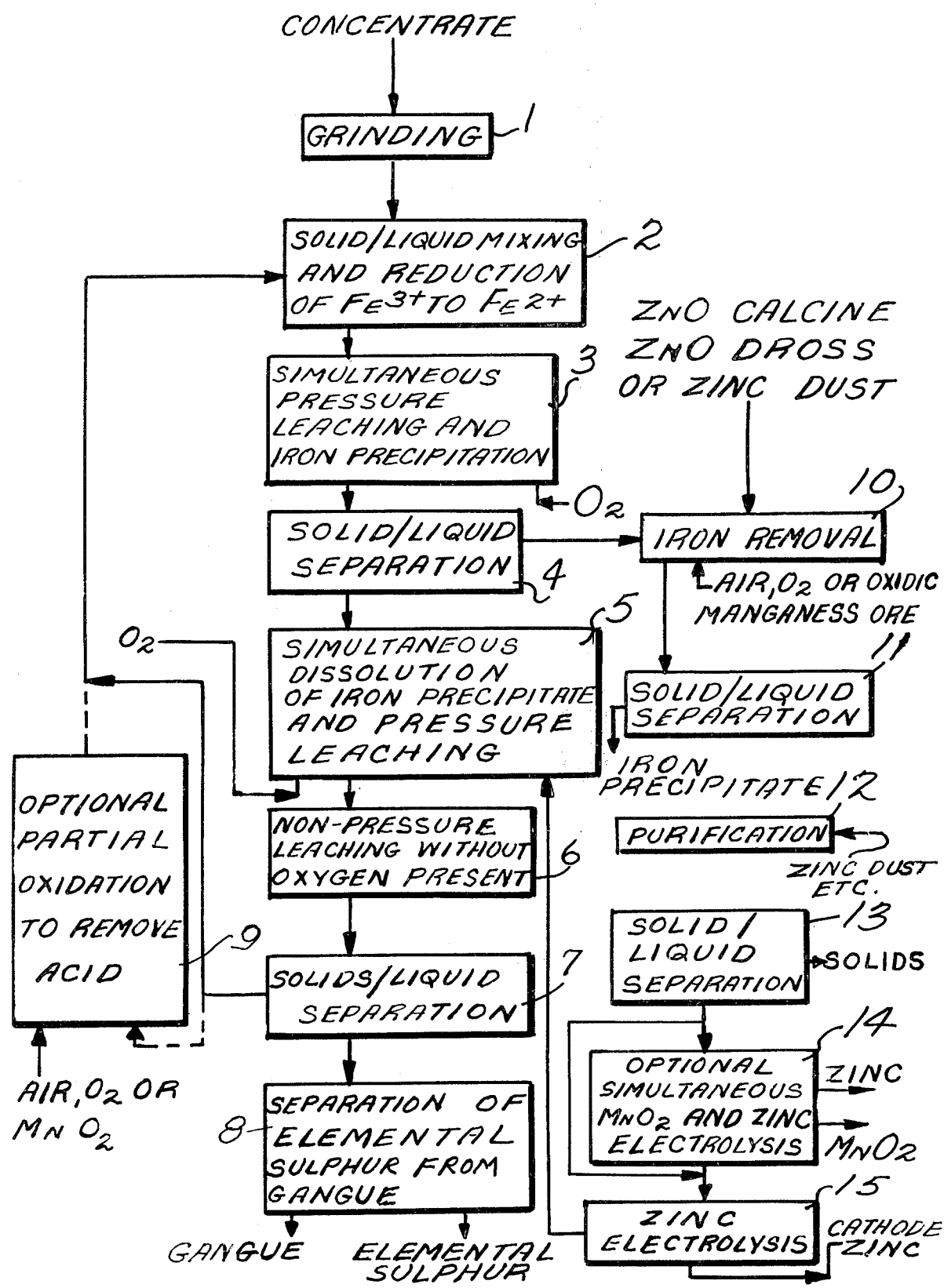

LEACHING OF ZINC CONTAINING SULPHIDE MINERALS

CROSS-REFERENCE TO RELATED APPLICATION

This application is a continuation-in-part of our earlier Application Ser. No. 113,284, filed Jan. 18, 1980, now U.S. Pat. No. 4,274,931.

THIS INVENTION relates to a process for leaching zinc containing sulphide minerals in order to recover metal values contained therein and at least some of the sulphide values in the form of elemental sulphur.

BACKGROUND OF THE INVENTION

In our South African Pat. No. 80/0224, we described a process wherein zinc sulphide containing material may be subjected to a two-stage leach process. In the first stage the ground material is leached, under pressure, with an aqueous solution having a high iron content and a low acid content. In the second stage the partly leached material together with precipitated iron, is leached with spent electroyte which has a high acid content. Both leaching stages are carried out at an elevated temperature which is below the melting point of sulphur (i.e. 119° C.), and pressure, the partial pressure of oxygen being one of the important factors.

The process as described in South African Pat. No. 80/0224 has the disadvantage that an excess of zinc bearing sulphide mineral must be present to achieve acceptable leaching rates under elevated pressure. It is thus necessary to separate the unleached sulphide mineral from the final residue which contains a mixture of sulphides, gangue, elemental sulphur and any iron precipitate present, in order to recycle the unleached zinc sulphide mineral back to the first stage leach. It is also necessary to separate the elemental sulphur from the final multi-component residue mixture.

The present invention represents an improvement of the process described in South African Pat. No. 80/0224, and enables metal values to be recovered from zinc bearing sulphide minerals in such a way that the necessity to separate unleached sulphide mineral from a multi-component residue, in order to recycle unleached mineral may be eliminated.

Thus an object of this invention is to provide a process of the general type described wherein an excess of sulphide mineral is not necessary in order to achieve high dissolutions whilst also retaining the advantages of the process of our said earlier patent.

BRIEF DESCRIPTION OF THE INVENTION

In accordance with this invention there is provided a process for the treatment of zinc sulphide containing materials comprising the steps of:

(i) contacting in a first leaching stage at a temperature of from 70° C. to 119° C. at elevated pressure and under oxidising conditions, a sub-divided zinc sulphide containing material with an aqueous leach solution which has dissolved therein zinc and impurities, from 5 to 50 g/l iron, together with a maximum of 20 g/l sulphuric acid to dissolve zinc and other soluble metals in the zinc sulphide containing material by the oxidative action of ferric ions formed by the contemporaneous oxidation of ferrous ions to their ferric state and cause precipitation of iron;

(ii) separating the solids and leach liquor resulting from such first leaching stage;

(iii) subjecting the leach liquor obtained in step (ii) to any required purification steps followed by electrowinning of zinc therefrom to leave a spent electrolyte having regenerated sulphuric acid therein;

(iv) contacting, in a second leaching stage, and at elevated temperatures of from 70° C. to 119° C. and elevated pressure under oxidising conditions, spent electrolyte resulting from step (iii) above with the solids resulting from step (ii) above to cause redissolution of iron precipitate and the further dissolution of zinc and metal impurities from the residue of the zinc sulphide containing material by the oxidative action of ferric ions resulting from the dissolution of iron precipitate and also formed by the co-temporaneous oxidation of ferrous ions to the ferric state, said second leaching stage being terminated only when at least sufficient ferric ions are present to complete the leaching of the zinc sulphide containing material;

(v) carrying out a third leaching stage with the solids and liquids of the second leaching stages still in contact but under substantially ambient pressure, in the absence of free oxygen and at temperatures of up to the boiling point of the solution;

(vi) separating the solids and leach solution resulting from step (v) and;

(vii) utilising the leach solution resulting from step (vi) as at least the major portion of the aqueous leach solution employed in step (i).

BRIEF DESCRIPTION OF THE DRAWINGS

FIG. 1 is a schematic process flow diagram illustrating the various steps of the invention, which are described in more detail below.

Further features of the invention provide for conditions in step (i) to be controlled such that the iron is precipitated predominently in the form of goethite which is easily acid soluble in step (iv), for iron to be removed at an overall rate at which it is introduced into the system by way of the zinc containing material; and for the zinc containing material to be a finely ground zinc sulphide containing mineral or ore such as sphalerite, for example.

Still further features of the invention provide for the iron added to the system by way of the zinc sulphide containing material to be removed from the liquid resulting from the solid-liquid separation (step 2) following the first leaching stage and for such removal to be effected by the addition of low grade oxidic manganese ore as an oxidant and neutralising agent or, alternatively, by the addition of conventional oxidising and neutralising agents.

Where such a manganese agent is employed the manganese and zinc can then be removed simultaneously in the form of manganese dioxide and electrolytic zinc by a process as is fully described in the Complete Specification of our issued South African Patent No. 80/1590. In such a process the manganese added to a system is electrolytically recovered as manganese dioxide simultaneously with some zinc in a first electrolytic cell in which conditions are particularly favourable for the recovery of manganese dioxide. A second electrolytic recovery follows for the main bulk of the zinc. Further details of the process may be obtained by referring to the said Complete Specification.

The advantages of the improvements brought about by the present invention will become more apparent in the following description of the process. In this description reference will be made to the accompanying drawing which is a process flow diagram.

DETAILED DESCRIPTION OF THE INVENTION

The basic steps of the process, which are discussed more fully below, are as follows:

The concentrate or other material may require grinding and this is carried out in a grinding step 1. The material is then mixed with the leaching solution at step 2 wherein ferric ions tend to be reduced to the ferrous state prior to being subjected to oxidising conditions at elevated temperature and pressure at step 3 to conduct the first leaching stage.

The solids and liquid are separated at step 4 and the solids contacted with regenerated sulphuric acid emanating from the zinc recovery circuit. This takes place at elevated temperature and pressure under oxidising conditions and constitutes the second leaching stage indicated as step 5. The following non-oxidative third leaching stage is conducted at ambient pressure and is indicated as step 6.

The subsequent liquid/solid separation is known as step 7 followed by treatment at step 8 of the solids to recover elemental sulphur from the gangue. The liquid, now low in acid is recycled to the first leaching stage (step 3) optionally after partial oxidation at step 9 to remove or consume acid if this be necessary.

The liquid from the first liquid/solid separation of step 4 is subjected at step 10 to the removal of iron added to the circuit by way of the incoming concentrate and precipitated iron is removed at step 11. The resultant liquid is purified at step 12 such as by the addition of zinc dust and solids are removed at step 13.

The zinc containing solution is then ready for electrowinning which, where manganese is added to the circuit, takes place in a first electrolytic step 14 in which manganese dioxide and zinc are removed simultaneously followed by the main zinc removal and second electrolytic step 15 from whence regenerated acid (spent electrolyte) is fed to the second leaching stage.

The starting material may be any suitable zinc sulphide containing material but in this specification a zinc manganese and iron containing sulphidic flotation concentrate will be used by way of an example. The concentrate enters the process at step 1. Finer grinding of the mineral may prove to be advantageous as it could result in acceleration of leaching rates, and a decrease in leaching retention times and hence in a decrease in the size and cost of the leaching equipment. On the other hand step 1 may not be necessary and the flotation concentrate may possibly be used as received. The concentrate is then pulped with leaching solution usually at between 70° C. and 90° C. in step 3 to produce a slurry with conveniently having a 5:1 to 7:1 liquid:solid ratio. The amount of concentrate actually slurried per unit volume of leach solution will be such as to permit the desired amount of zinc to be dissolved per unit volume of solution.

The leach solution entering step 2 will typically contain between 5 and 50 g/l dissolved iron; between 1 g/l and 15 g/l sulphuric acid but preferably as low as possible and less than about 5 g/l acid; between 70 g/l and 120 g/l dissolved zinc, but preferably about 90 g/l zinc, and between 5 g/l and 20 g/l dissolved manganese but preferably about 15 g/l to 20 g/l manganese.

In step 2, ferric ions present in the leach solution will rapidly reduce to their ferrous state. This is an advantage since it has been found, and it is known by those skilled in the art that the flocculation, settling and filtration characteristics of the iron precipitate produced in step 3 are improved when the ferric ion concentration is maintained at low levels.

The slurry from step 2 proceeds to step 3, where the first leaching stage takes place at a temperature of between say 70° C. and 119° C., and preferably at 90° C. to 100° C. with an oxygen overpressure of between 100kPa and 1000kPa, but preferably between 300kPa and 500kPa. In step 3, soluble sulphide metals such as zinc, manganese or iron dissolve, and iron is precipitated simultaneously until the dissolved iron remaining in solution equals that which is capable of being dissolved from the concentrate throughout the entire process so that removal of this residual iron in step 10 will result in a mass balance of the dissolved iron throughout the circuit.

The solution at the end of the first leach in step 3 will contain typically less than 5 g/l of free sulphuric acid, typically 120 to 160 g/l dissolved zinc, 5 to 15 g/l dissolved iron (depending on the amount of soluble iron originally present in the concentrate); and typically 10 to 25 g/l dissolved manganese, (depending on the amount of manganese dissolved in step 3).

The slurry from step 3 is dewatered in step 4. In batch laboratory experimentation it was found that flocculation of the slurry was assisted by prior mixing of the pulp with say two parts of previously prepared filtered leach liquor with same solution composition as the slurry solution composition, to one part of fresh slurry. (In a continuous operation such dilution would probably occur automatically in the feed well of a thickening apparatus). The flocculated solids are permitted to settle, after which the supernatant liquor is decanted and the flocculated, settled solids are filtered.

The leach liquor filtrate from step 4 proceeds to step 10 where the remaining dissolved iron is removed at between 70° to 100° C. by simultaneously treating the solution with a neutralising agent (such as zinc oxide calcine, zinc oxide dross or zinc dust), and an oxidant (such as air or oxygen). It has been found that a ground oxidic manganese ore can be used to simultaneously oxidise and behave as a neutralising agent and so enable the dissolved iron to be precipitated from solution. The removal of part or all of the residual dissolved iron by such an oxidic manganese ore, could result in the necessity to use significantly less zinc oxide, zinc dross or zinc dust in step 10, and result in the recovery of the extra manganese ions introduced into the solution, as valuable battery grade manganese dioxide in step 14.

The solution from step 10 is flocculated and filtered in step 11, and the filter cake is disposed of after suitable washing to recover soluble values therefrom. The filtrate from step 11 containing up to 180 g/l zinc, and up to 30 g/l manganese and at a pH greater than 2.0 is subjected to several further purification steps at between 70° C. and 90° C. as typified by step 12; to reduce contaminants such as iron, cobalt, copper, cadmium, etc. to very low levels by use of processes well known to those skilled in the art. The purified solution from step 12 is filtered as denoted by step 13 and proceeds to the optional electrolytic step 14 for simultaneous electro recovery of part of the zinc at a cathode, and sufficient manganese as manganese dioxide at an anode to maintain a manganese ion balance throughout the process. The solution enters the first electrowinning step 14 direct from the purification steps and thus initially contains a very low acid concentration and high zinc concentration.

During the first electrolysis step 14 sulphuric acid is regenerated, one mole of acid being formed for each mole of zinc or manganese which is electro deposited. The process for the simultaneous electrowinning of zinc and manganese has been fully expounded in our said South African Pat. No. 80/1590. Needless to say, if only relatively small amounts of manganese are dissolved throughout the process, alternative means for controlling the dissolved manganese at desired levels exist, of which those skilled in the art would be aware.

The purified solution from step 13, or optionally from step 14 proceeds to step 15 where sufficient zinc is electrowon to maintain a zince balance throughout the circuit by means of a conventional zinc electrowinning process.

The solution, or so-called returned electrolyte from step 15 containing typically 140–180 g/l sulphuric acid, 40–60 g/l zinc iron and 5–20 g/l manganese ions proceeds to the second leaching stage at step 5 where it is contacted at typically between 70° C. and 119° C. but preferably at 90° C.–100° C. with the filtered solids from step 4 which contain unleached sulphide mineral, elemental sulphur and precipitated iron.

In step 5 much of the iron precipitate is rapidly dissolved by the acid in the return electrolyte to form dissolved ferric ions in solution, and this results in a rapid decrease in the sulphuric acid concentration of the solution. The ferric ions produced by the dissolved iron precipitate react with the sulphides present to dissolve the sulphides and form ferrous ions. However, since oxygen at an oxygen overpressure of between 100–1000 kPa, and preferably, at about 300–500 kPa is present, the ferrous ions are continuously oxidised to their ferric state, thus consuming acid and permitting dissolution of the sulphides by the ferric ions to proceed. Dissolution of the sulphides virtually to completion could conceivably be attained under pressure conditions in step 5, but this is not necessary and the retention time in step 5 can, as provided by the invention, be shortened considerably.

This second leaching stage can be terminated when the leach solution contains at least stoichiometrically sufficient ferric ions to permit dissolution of the sulphides to proceed substantially to completion without any elemental oxygen being present. At this stage the liquid/solid mixture proceeds to the third leaching stage at step 6.

It is desirable that conditions be adjusted so that at the end of leaching step 6 the sulphuric acid concentration be as low as possible without precipitation of the ferric ions actually taking place and should be less than about 15 g/l.

The temperature in step 6 should be between 70° C. and the boiling point of the solution, but preferably above 90° C. Leaching in step 6 should be permitted to proceed until economically negligible further reduction in the ferric ion concentration with time, due to leaching is detected. It is desirable that the ferric ion concentration at the end of step 6 be minimised, yet be such that realistic rates of leaching of the residual soluble sulphides be attained.

The leach slurry from step 6 is filtered in step 7 to produce a filter cake containing unleached sulphides, elemental sulphur, gangue and some acid insoluble iron precipitates (e.g. such as plumbojarosite, if soluble lead was present in the original concentrate).

The elemental sulphur may be recovered from this filter cake in step 8 by methods known to those skilled in the art. Optionally, methods exist for the recovery of the elemental sulphur directly from the leach solution after step 6. The filtrate from step 7 should now be at a composition similar to that previously described for the solution entering the first leaching stage step 2. If the sulphuric acid concentration in the solution emanating from step 7 is undesirably high (e.g. greater than about 15 g/l) it is possible to reduce this acid level to a point at which hydrolysis of the ferric species is just avoided by the oxidation of ferrous ions to their ferric state using air, oxygen or ground oxidic manganese ore. If air or oxygen is used, it is probable that an oxygen over-pressure of say 100 kPa to 500 kPa will be required to reduce the retention time in step 9 to acceptable limits.

The reason for reducing the acid concentration in step 9 and the ferric ion concentration in step 2 is to improve the flocculation and filtration characteristics of the iron precipitate produced in step 3, as it is well known to those skilled in the art that the production of goethite-type iron precipitates in the temperature range of 70° C.–119° C. is favoured by higher pH's and low ferric ion concentrations.

EXAMPLE 1

In this example 830.0 g of a dry flotation concentrate assaying Zn—50.9%; Fe—9.1%; Mn—2.5%; Pb—0.47%; S(total—30.8%); Cu—0.14%; Cd—0.08%; Co—0.01%; $SiO_2$—2.19% was rod milled until 100.0% of the concentrate passed through a 45.0 μm screen. The size distribution of this milled product, when measured in a WARMAN CYCLOSIZER was as follows:

TABLE 1

| Size in Microns | % Greater than |
|---|---|
| 44 | 0 |
| 41 | 0,8 |
| 32 | 6,1 |
| 23 | 24,8 |
| 16 | 42,7 |
| 12 | 54,2 |

This 850.0 g of dry milled concentrate was added to 5.0 l leach solution which initially contained 97.0 g/l ZN; 18.6 g/l Mn; 38.9 g/l $Fe^{2+}$; 0.5 g/l $Fe^{3+}$; and 9.6 g/l $H_2SO_4$. The reaction Cn first leaching stage was allowed to proceed for 45.0 mins at 100.0° C. with a 500 kPa oxygen overpressure. After 45.0 mins. the leach solution contained 11.3 g/l $Fe^{2+}$ and about 121.0 g/l Zn and 19.96 g/l Mn. The leach solids were flocculated and filtered but not weighed and assayed.

All the leach solids referred to above were then added to 5.0 l simulated return electrolyte containing 50.6 g/l Zn; 21.9 g/l Mn; 146.0 g/l $H_2SO_4$. The second leaching stage reaction was permitted to proceed for 30.0 minutes at 100.0° C. with a 500 kPa oxygen overpressure. At this point the solution contained 22.2 g/l $Fe^{3+}$; 11.8 g/l $Fe^{2+}$; and 19.2 g/l $H_2SO_4$ and the pressure was diminished to atmospheric and the supply of oxygen terminated. The ferric species present in the leaching solution was then permitted to effect leaching for a further 9½ hours without oxygen present to allow dissolution of the sphalerite to continue. This constituted the third leaching stage. The final leach solution assayed 25.7 g/l $Fe^{2+}$; 7.2 g/l $Fe^{3+}$; 14.8 g/l $H_2SO_4$; 108.1 g/l Zn and about 24.8 g/l Mn. Table 2 below summarises the change with time of the ferric ion, ferrous ion and sulphuric acid concentration, the percentage zinc remaining in the leach residue, and the calculated total zinc extraction in respect of the third leach stage. The final leach solids which were filtered, washed and dried, weighed 257.0 g and assayed 0.62% Zn; <0.2% Mn and 8.8% Fe. The overall percentage of zinc, manganese and iron leached in this example were thus about 99.5%; 97.0% and 74.0% respectively.

TABLE 2

| Time (mins) | $Fe^{3+}$ g/l | $Fe^{2+}$ g/l | $H_2SO_4$ g/l | Zn in residue % | Total dissolution of Zinc |
| --- | --- | --- | --- | --- | --- |
| 0 | 22,2 | 11,8 | 19,2 | 15,50 | 88,11 |
| 30 | 19,0 | 15,4 | 15,4 | 12,20 | 90,96 |
| 60 | 15,1 | 19,0 | 14,8 | 9,05 | 93,71 |
| 90 | 12,5 | 21,3 | 15,0 | 6,46 | 95,55 |
| 150 | 10,6 | 23,2 | 14,8 | 5,50 | 96,24 |
| 210 | 9,1 | 24,4 | 15,0 | 3,34 | 97,73 |
| 282 | 8,7 | 25,4 | 15,0 | 2,76 | 98,15 |
| 380 | 7,6 | 25,3 | 14,9 | 1,67 | 98,89 |
| 580 | 7,2 | 25,7 | 14,8 | 0,62 | 99,50 |

EXAMPLE 2

The flotation concentrate described in Example 1 was used in this example "as received" from the flotation cells without further milling. This concentrate was coarse (relative to that used in the first example), as only 36.7% of the concentrate passed through a 45 μm screen. The size distribution of this material, when measured on a Warman Cyclosizer was as follows:

TABLE 3

| Size in Microns | % Greater than |
| --- | --- |
| 29,3 | 61,52 |
| 22,8 | 71,21 |
| 16,4 | 79,80 |
| 11,1 | 84,41 |
| 8,5 | 100 |

935.0 g of this concentrate containing about 10.0% moisture was added to 5.0 l leach solution which initially contained 98.0 g/l Zn; 18.5 g/l Mn; 38.9 g/l $Fe^{2+}$; 0.5 g/l $Fe^{3+}$; and 9.6 g/l $H_2SO_4$. The first leach stage reaction was allowed to proceed for 50 minutes at 100.0° C. with a 500.0 kPa oxygen overpressure. After 50 minutes the leach solution contained 8.9 g/l $Fe^{2+}$; 1.0 g/l $Fe^{3+}$; 3.0 g/l $H_2SO_4$ and about 137.0 g/l Zn and 20.5 g/l Mn. The leach solids were fluocculated and filtered, but not weighed and assayed.

All the leach solids referred to above were then added to 5.0 l simulated return electrolyte containing 50.6 g/l Zn; 21.9 g/l Mn and 146.0 g/l $H_2SO_4$ and zero dissolved iron. The second leach stage reaction was permitted to proceed for 110.0 minutes at 100.0° C. with 500.0 kPa oxygen overpressure. At this point the solution contained 28.2 g/l $Fe^{3+}$; 6.2 g/l $Fe^{2+}$ and 13.2 g/l $H_2SO_4$, and because of the ferric species present, the leaching was permitted to proceed by way of the third leach stage for a further 5.0 hours at 100.0° C. without oxygen present (i.e no oxygen overpressure) to allow dissolution of the sphalerite to continue. The final solution assayed 17.2 g/l $Fe^{2+}$; 16.6 g/l $Fe^{3+}$; 11.0 g/l $H_2SO_4$; 95.0 g/l Zn and about 24.1 g/l Mn. The final leach solids which were filtered, washed and dried, weighted 247.7 g (dry) and assayed 3.6% Zn; 0.3% Mn; 8.4% Fe and 60.4% elemental sulphur.

The overall percentages of zinc, manganese and iron leached in this example were thus about 98.0% 96.5% and 73.0% respectively. It will thus be noted that the coarse material leached extremely well only not quite as well as the finely milled concentrate.

EXAMPLE 3

This example serves to illustrate the optional use of an oxidic manganese ore as a neutralising and oxidising agent to remove dissolved iron from a leach solution.

180.0 g of a pyrolucite-type oxidic manganese ore (assaying Mn—24.9%; Fe—15.6% and having 85.2% passing through a 53.0 μm screen) was added to 5.0 l solution assaying $Zn^{2+}$—150.0 g/l; $Fe^{3+}$—0 g/l; $Fe^{2+}$—9.6 g/l; $H_2SO_4$—9.8 g/l; $Mn^{2+}$—20.3 g/l which was at 90.0° C. and was vigorously stirred. Table 4 summarises the change with time of the $Mn^{2+}$, $Fe^{2+}$ and $H_2SO_4$ concentrations, and the pH. It is observed that the total acid and iron concentrations drop to about 2.4 g/l and 1.0 g/l respectively in only two hours.

TABLE 4

| Time (mins) | $Mn^{2+}$ g/l | $Fe^{2+}$ g/l | $Fe^{3+}$ g/l | $H_2SO_4$ g/l | pH |
| --- | --- | --- | --- | --- | --- |
| 0 | 20,3 | 9,6 | 0 | 9,8 | 0,5 |
| 15 | 22,1 | 3,4 | 2,0 | 0 | 1,57 |
| 30 | 25,4 | 2,3 | 1,4 | 1,0 | 1,48 |
| 45 | 25,3 | 1,6 | 1,3 | 1,0 | 1,40 |
| 60 | 26,3 | 1,0 | 1,1 | 2,0 | 1,36 |
| 90 | 27,3 | 0,2 | 1,0 | 2,2 | 1,29 |
| 120 | 28,3 | 0 | 1,0 | 2,4 | 1,24 |
| 180 | 27,3 | 0 | 1,0 | 2,6 | 1,22 |

Use of 180.0 g of oxidic manganese ore to remove iron from 5.0 l solution at 90.0° C. which initially contained 150.0 g/l zinc ions.

Production of iron precipitates demonstrating improved flocculation and filtration characteristics was favoured by somewhat slower rates of iron removal.

EXAMPLE 4

This is another example of the use of oxidic manganese to remove dissolved iron from typical zinc leach solution. Sixteen grams of a high grade manganese dioxide (assaying 74% as $MnO_2$) was added per liter of solution which initially contained 12.1 g/l $Fe^{2+}$ and 1.4 g/l $Fe^{3+}$. After 60 minutes stirring at 90° C. the solution contained less than 0.1 g/l $Fe^{2+}$ and 2.5 g/l $Fe^{3+}$. After a further 50 minutes 14.7 grams of zinc dioxide calcine was added to the solution and after 40 minutes the solution contained no $Fe^{2+}$ and about 0.6 g/l $Fe^{3+}$.

EXAMPLE 5

850 g of dry flotation concentrate was leached without additional milling in steps 2 and 5. This example gives the results of leaching the residue contained in the solution obtained at the end of step 5 in step 6 at a constant temperature of 90° C. The conditions and results are summarised in Table 5.

TABLE 5

| Time (mins) | $Fe^{2+}$ g/l | $Fe^{3+}$ g/l | $H_2SO_4$ g/l | % Zn in residue | % Dissolution of Zn |
| --- | --- | --- | --- | --- | --- |
| 0 | 6,0 | 32,8 | 11,2 | — | 92,2 |
| 30 | 9,5 | 29,2 | 11,4 | — | 94,6 |
| 100 | 14,1 | 24,4 | 11,8 | 9,2 | 97,7 |
| 160 | 16,7 | 21,9 | 12,8 | 7,0 | 98,2 |
| 240 | 18,4 | 20,4 | 13,6 | 5,0 | 98,7 |

TABLE 5-continued

| Time (mins) | Fe$^{2+}$ g/l | Fe$^{3+}$ g/l | H$_2$SO$_4$ g/l | % Zn in residue | % Dissolution of Zn |
|---|---|---|---|---|---|
| 260 | 19,4 | 20,6 | 13,2 | 3,9 | 99,0 |

It is observed that the percentage dissolution of zinc increases with time to a very high value, indicating that relatively high dissolutions of zinc can be obtained when leaching flotation concentrate which has not been ground finer. Only additional time is required and this must be weighed up relative to the cost of milling.

EXAMPLE 6

This example is similar to example 5, except in that the temperature of the leach solution in step 6 was permitted to decrease with time from 97° C. to 70° C.

850 g of dry flotation concentrate was leached without additional milling in steps 2 and 5. Table 6 summarises the conditions and results of leaching the residue in the solution obtained at the end of step 5.

It is observed by comparing the results of Tables 3 and 4 that the effect of the decrease in temperature during step 5 of Table 6 is to increase the leaching time required to achieve a given percentage dissolution of zinc. It is interesting to note in Table 4 that the H$_2$SO$_4$ concentration decreases with time, and the total dissolved iron (Fe$^{2+}$ + Fe$^{3+}$) increases with time.

TABLE 6

| Time (mins) | Temp °C. | Fe$^{2+}$ g/l | Fe$^{3+}$ g/l | H$_2$SO$_4$ g/l | % Zinc in residue | % dissolution of Zinc |
|---|---|---|---|---|---|---|
| 0 | 97,0 | 7,5 | 28,5 | 9,5 | 11,2 | 91,8 |
| 30 | 86,0 | 11,1 | 25,5 | 9,0 | 9,2 | 93,3 |
| 90 | 71,0 | 13,0 | 23,6 | 8,5 | 8,2 | 95,6 |
| 150 | 70,0 | 14,0 | 22,8 | 8,4 | 5,8 | 95,6 |
| 360 | 70,0 | 15,9 | 21,2 | 6,8 | 3,8 | 97,3 |
| 480 | 70,0 | 15,7 | 21,8 | 3,6 | 2,2 | 98,5 |
| 780 | 70,0 | 13,7 | 23,6 | 1,0 | 1,5 | 99,0 |

It is possible that as the temperature decreases the solubility of ferric ions in solution increases thus permitting iron precipitate which had previously hydrolysed, to redissolve, thus consuming acid and increasing the total dissolved iron concentration in solution. This phenomenon was not observed in Table 5, possibly because the temperature was maintained at 90° C.

The invention therefor provides an effective and economic process for the leaching of zinc sulphide containing materials.

What I claim as new and desire to secure by Letters Patent is:

1. A process for the treatment of zinc sulphide containing materials comprising the steps of:
   (i) contacting in a first leaching stage at a temperature of from 70° C. to 119° C. at elevated pressure and under oxidising conditions, a sub-divided zinc sulphide containing material with an aqueous leach solution which has dissolved therein zinc and impurities, from 5 to 50 g/l iron, together with a maximum of 20 g/l sulphuric acid to dissolve zinc and other soluble metals in the zinc sulphide containing material by the oxidative action of ferric ions formed by the contemporaneous oxidation of ferrous ions to their ferric state and cause precipitation of iron;
   (ii) separating the solids and leach liquor resulting from such first leaching stage;
   (iii) subjecting the leach liquor obtained in step (ii) to any required purification steps followed by electrowinning of zinc therefrom to leave a spent electrolyte having regenerated sulphuric acid therein;
   (iv) contacting, in a second leaching stage, and at elevated temperature of from 70° C. to 119° C. and elevated pressure under oxidising conditions, spent electrolyte resulting from step (iii) above with the solids resulting from step (ii) above to cause redissolution of iron precipitate and the further dissolution of zinc and metal impurities from the residue of the zinc sulphide containing material by the oxidative action of ferric ions resulting from the dissolution of iron precipitate and also formed by the co-temporaneous oxidation of ferrous ions to the ferric state, said second leaching stage being terminated only when at least sufficient ferric ions are present to complete the leaching of the zinc sulphide containing material;
   (v) carrying out a third leaching stage with the solids and liquids of the second leaching stages still in contact but under substantially ambient pressure, in the absence of free oxygen and at temperatures of up to the boiling point of the solution;
   (vi) separating the solids and leach solution resulting from step (v) and;
   (vii) utilising the leach solution resulting from step (vi) as at least the major portion of the aqueous leach solution employed in step (i).

2. A process as claimed in claim 1 in which the conditions in step (i) are controlled such that iron which is precipitated does so predominently in the form of goethite.

3. A process as claimed in claim 1 in which iron is present in the zinc sulphide containing material and iron is removed at an overall rate at which it is introduced into the system.

4. A process as claimed in claim 3 in which iron is removed from the liquid resulting from the solid/liquid separation in step (ii) following the first leaching stage.

5. A process as claimed in claim 4 in which low grade oxidic manganese ore is employed as an oxidant and neutralising agent to effect removal of iron.

6. A process as claimed in claim 1 in which the zinc sulphide containing material is a finely ground ore.

7. A process as claimed in claim 1 in which the spent electrolyte contains 140 to 180 g/l sulphuric acid and 40 to 60 g/l zinc.

8. A process as claimed in claim 7 in which the spent electrolyte contains from 5 to 20 g/l manganese ions.

9. A process as claimed in claim 1 in which the leach solution entering step (i) contains from 1 to 20 g/l sulphuric acid and from 70 to 120 g/l zinc.

10. A process as claimed in claim 1 in which the leach liquor leaving step (i) contains from 5 to 15 g/l dissolved iron; from 120 to 160 g/l zinc and less than 5 g/l sulphuric acid.

11. A process as claimed in claim 1 in which the leaching in steps (i) and (iv) is carried out under an oxygen overpressure of between 100 kPa and 1000 kPa.

12. A process as claimed in claim 11 in which the oxygen overpressure is between 300 kPa and 500 kPa.

13. A process as claimed in claim 1 in which the leaching in steps (i) and (iv) is carried out from 90° C. to 100° C.

* * * * *